US012643358B1

(12) United States Patent
Berardi

(10) Patent No.: US 12,643,358 B1
(45) Date of Patent: Jun. 2, 2026

(54) SUSPENSION SYSTEM

(71) Applicant: XTravel Suspension, LLC, Southlake, TX (US)

(72) Inventor: Nestor Alexander Berardi, Temecula, CA (US)

(73) Assignee: XTravel Suspension, LLC, Southlake, TX (US)

( * ) Notice: Subject to any disclaimer, the term of this patent is extended or adjusted under 35 U.S.C. 154(b) by 0 days.

(21) Appl. No.: 18/124,480

(22) Filed: Mar. 21, 2023

Related U.S. Application Data

(60) Provisional application No. 63/322,153, filed on Mar. 21, 2022.

(51) Int. Cl.
B60G 3/20 (2006.01)
B62D 7/08 (2006.01)
(Continued)

(52) U.S. Cl.
CPC ................. B60G 3/20 (2013.01); B62D 7/08 (2013.01); B62D 7/18 (2013.01); B62D 7/20 (2013.01); B60G 2200/14 (2013.01); B60G 2202/30 (2013.01); B60G 2204/422 (2013.01); B60G 2204/43 (2013.01); B60G 2206/10 (2013.01);
(Continued)

(58) Field of Classification Search
CPC ............ B60G 2204/129; B60G 15/067; B60G 2204/422; B60G 2204/4232; B60G 3/01; B60G 3/20; B60G 2200/14; B60G 2202/30; B60G 2204/43; B60G 2206/10;
(Continued)

(56) References Cited

U.S. PATENT DOCUMENTS 1,888,801 A    11/1932    Herold
2,525,622 A    10/1950    Shafer
(Continued)

FOREIGN PATENT DOCUMENTS

CN    101474951 B    12/2010
CN    109017183 A    12/2018
(Continued)

OTHER PUBLICATIONS

Korean Intellectual Property Office, International Search Report and Written Opinion, PCT/US2021/054637, Jan. 26, 2022.
(Continued)

*Primary Examiner* — Timothy Wilhelm
(74) *Attorney, Agent, or Firm* — Umberg Zipser LLP; Ryan Dean

(57) ABSTRACT

Suspension systems for vehicles are described that allow the suspension reaction to vertical loads to be decoupled to suspension movement in reaction to horizontal forces. Contemplated suspension systems comprise a knuckle assembly carrying at least a wheel and bearing assembly for contacting the ground at an edge of the vehicle. A first link connects a first rotatable joint to the knuckle assembly and to a chassis or subframe on the vehicle. A second link connects a second rotatable joint to the knuckle assembly and to the chassis or subframe on the vehicle. A spring and damper link connects the first link to the second link, and a spring damper system comprising a shock assembly that is mounted or coupled to the first link off a center axis of the first link.

13 Claims, 10 Drawing Sheets

(51) Int. Cl.
    *B62D 7/18*        (2006.01)
    *B62D 7/20*        (2006.01)

(52) U.S. Cl.
    CPC .... *B60G 2206/50* (2013.01); *B60G 2800/162* (2013.01)

(58) Field of Classification Search
    CPC .......... B60G 2206/50; B60G 2800/162; B62D 7/08; B62D 7/18; B62D 7/20
    See application file for complete search history.

(56)             References Cited

U.S. PATENT DOCUMENTS

| | | | |
|---|---|---|---|
| 2,566,421 | A | 9/1951 | Lapointe |
| 2,715,712 | A | 8/1955 | William |
| 2,776,721 | A * | 1/1957 | Giacosa .................. B60K 5/10 |
| | | | 180/291 |
| 2,779,642 | A | 1/1957 | Matthews |
| 2,921,450 | A | 1/1960 | Klomp |
| 4,145,072 | A | 3/1979 | Matschinsky |
| 4,542,920 | A * | 9/1985 | Kijima ................. B60G 21/055 |
| | | | 267/248 |
| 4,611,681 | A | 9/1986 | Krude et al. |
| 4,681,342 | A | 7/1987 | Goerich |
| 4,705,292 | A * | 11/1987 | Hespelt .................... B60G 3/26 |
| | | | 280/86.751 |
| 4,708,361 | A | 11/1987 | Takada et al. |
| 4,714,270 | A | 12/1987 | Rumpel |
| 4,723,791 | A | 2/1988 | Miura et al. |
| 4,756,546 | A | 7/1988 | Kubo et al. |
| 4,819,959 | A | 4/1989 | Inoue et al. |
| 4,842,296 | A | 6/1989 | Kubo |
| 4,863,188 | A | 9/1989 | Killian |
| 4,878,688 | A * | 11/1989 | Kubo ........................ B60G 3/20 |
| | | | 280/124.138 |
| 4,930,805 | A | 6/1990 | Takata et al. |
| 4,941,677 | A | 7/1990 | Matsumoto et al. |
| 4,948,161 | A | 8/1990 | Tonomura |
| 4,978,131 | A | 12/1990 | Edahiro et al. |
| 5,026,091 | A | 6/1991 | Lee |
| 5,048,860 | A | 9/1991 | Kanai et al. |
| 5,100,165 | A | 3/1992 | Hespelt |
| 5,116,076 | A | 5/1992 | Moll |
| 5,284,353 | A | 2/1994 | Shinji et al. |
| 5,415,427 | A | 5/1995 | Sommerer et al. |
| 5,421,606 | A | 6/1995 | Chun |
| 5,496,055 | A * | 3/1996 | Shibahata ................ B62D 7/18 |
| | | | 280/124.141 |
| 5,499,839 | A * | 3/1996 | Wahl ...................... B60G 3/202 |
| | | | 280/124.145 |
| 5,507,510 | A * | 4/1996 | Kami ....................... B60G 3/26 |
| | | | 280/124.136 |
| 5,697,633 | A | 12/1997 | Lee |
| 6,123,351 | A | 9/2000 | Bruehl |
| 6,293,561 | B1 * | 9/2001 | Goetzen ................ B62D 17/00 |
| | | | 280/86.757 |
| 6,547,027 | B1 * | 4/2003 | Kalhok ...................... B62J 1/12 |
| | | | 180/215 |
| 6,676,144 | B2 * | 1/2004 | Wagner .................... B60G 3/20 |
| | | | 280/124.135 |
| 6,767,022 | B1 | 7/2004 | Chevalier |
| 6,783,136 | B2 | 8/2004 | Timoney et al. |
| 6,945,547 | B2 | 9/2005 | Ackley et al. |
| 7,004,484 | B1 * | 2/2006 | Chevalier ................ B60G 3/20 |
| | | | 280/124.136 |
| 7,048,286 | B2 | 5/2006 | Eppelein |
| 7,168,719 | B2 | 1/2007 | Gerrard |
| 7,258,355 | B2 | 8/2007 | Amano |
| 7,281,716 | B2 * | 10/2007 | Fanson .................. B60G 3/265 |
| | | | 280/124.135 |
| 7,343,997 | B1 | 3/2008 | Matthies |
| 7,380,805 | B1 | 6/2008 | Turner |
| 7,441,788 | B2 | 10/2008 | Leclair |
| 7,591,337 | B2 * | 9/2009 | Suhre ...................... B60G 3/20 |
| | | | 280/5.509 |
| 7,661,687 | B2 * | 2/2010 | Seki ................... B60G 21/0551 |
| | | | 280/124.135 |
| 7,744,104 | B2 * | 6/2010 | Kuwabara ............... B60G 3/20 |
| | | | 280/124.134 |
| 7,784,805 | B2 * | 8/2010 | Morgan ............... B60G 15/067 |
| | | | 280/124.135 |
| 7,784,807 | B2 | 8/2010 | Brandl et al. |
| 7,845,452 | B2 | 12/2010 | Bennett et al. |
| 7,891,684 | B1 | 2/2011 | Luttinen et al. |
| 7,934,735 | B2 * | 5/2011 | Kuwabara ............. B60G 7/001 |
| | | | 280/124.135 |
| 7,950,486 | B2 | 5/2011 | Bronkhorst et al. |
| 7,954,835 | B2 * | 6/2011 | Nakamura ............... B60G 3/20 |
| | | | 280/124.135 |
| 7,963,538 | B2 | 6/2011 | Roland et al. |
| 8,056,912 | B2 * | 11/2011 | Kawabe ................... B60G 3/20 |
| | | | 280/124.135 |
| 8,079,602 | B2 | 12/2011 | Kinsman et al. |
| 8,141,891 | B2 * | 3/2012 | Yu ........................... F16F 7/082 |
| | | | 280/124.145 |
| 8,240,687 | B2 | 8/2012 | Kurosu |
| 8,240,689 | B2 * | 8/2012 | Holt ................... B60G 17/0272 |
| | | | 280/124.127 |
| 8,444,160 | B2 * | 5/2013 | Okamoto ................ B60G 3/20 |
| | | | 280/124.135 |
| 8,646,787 | B2 | 2/2014 | Langhoff et al. |
| 8,727,057 | B2 * | 5/2014 | Park ........................ B62K 5/05 |
| | | | 180/215 |
| 8,944,449 | B2 | 2/2015 | Hurd et al. |
| 9,205,874 | B2 | 12/2015 | Schindler et al. |
| 9,216,624 | B1 * | 12/2015 | Luttinen ................. B60G 3/20 |
| 9,216,625 | B2 | 12/2015 | Ruiz |
| 9,238,394 | B2 | 1/2016 | Leibl |
| 9,399,378 | B2 | 7/2016 | Goldberg et al. |
| 9,434,230 | B2 | 9/2016 | Schmitt et al. |
| 9,469,174 | B2 * | 10/2016 | Mohrlock ............. B60G 11/20 |
| 9,545,827 | B2 | 1/2017 | Goldberg et al. |
| 9,561,818 | B2 | 2/2017 | Uchihara |
| 9,579,942 | B2 | 2/2017 | Allen et al. |
| 9,586,613 | B2 * | 3/2017 | Shinbori ............... B60G 7/001 |
| 9,669,869 | B2 | 6/2017 | Kageyama et al. |
| 9,776,466 | B2 * | 10/2017 | Battaglia ................ B60G 3/18 |
| 9,844,991 | B2 | 12/2017 | Dusini et al. |
| 9,884,647 | B2 | 2/2018 | Peterson et al. |
| 9,944,142 | B2 * | 4/2018 | Mohrlock ............... B60G 3/20 |
| 9,981,519 | B2 * | 5/2018 | Despres-Nadeau ...... B60N 2/38 |
| 10,315,696 | B2 | 6/2019 | Gordon |
| 10,343,742 | B2 | 7/2019 | Zawistowski |
| 10,350,955 | B2 * | 7/2019 | Langhoff ................ B60G 3/20 |
| 10,399,401 | B2 | 9/2019 | Schlangen et al. |
| 10,442,263 | B2 | 10/2019 | Gordon |
| 10,442,264 | B2 * | 10/2019 | Mailhot ................ B60G 7/008 |
| 10,457,140 | B2 | 10/2019 | Bennett et al. |
| 10,479,408 | B2 * | 11/2019 | Upah ..................... B62D 23/005 |
| 10,525,781 | B2 | 1/2020 | Upah et al. |
| 10,532,772 | B2 | 1/2020 | Upah et al. |
| 10,800,224 | B2 | 10/2020 | Sellars et al. |
| 10,821,794 | B2 * | 11/2020 | Nakashima ............. B60G 3/20 |
| 11,117,436 | B2 * | 9/2021 | Chang ............... B60G 21/0558 |
| 11,161,544 | B2 * | 11/2021 | De Grammont ....... B62D 7/142 |
| 11,192,414 | B1 * | 12/2021 | Berardi ................. B60G 7/003 |
| 11,230,150 | B2 * | 1/2022 | Aknin .................... B60G 15/06 |
| 11,511,581 | B1 * | 11/2022 | Berardi ................. B60G 3/265 |
| 11,571,939 | B2 * | 2/2023 | Berardi ................... B60G 3/18 |
| 11,633,996 | B2 * | 4/2023 | Andou .................... B60G 7/04 |
| | | | 280/124.128 |
| 11,639,196 | B2 * | 5/2023 | Ryu ................... B60G 17/0157 |
| | | | 280/5.521 |
| 11,643,035 | B2 * | 5/2023 | Kotrla ..................... B60G 3/20 |
| | | | 293/117 |
| 11,648,813 | B2 * | 5/2023 | Li ............................ B60G 7/04 |
| | | | 280/788 |
| 2004/0140641 | A1 | 7/2004 | Eppelein |
| 2005/0072613 | A1 | 4/2005 | Maltais et al. |
| 2005/0247502 | A1 * | 11/2005 | Ziech ...................... B62D 7/18 |
| | | | 280/93.512 |

(56) References Cited

U.S. PATENT DOCUMENTS

| | | | | |
|---|---|---|---|---|
| 2005/0248116 | A1* | 11/2005 | Fanson | B60G 3/265 |
| | | | | 280/124.135 |
| 2005/0275183 | A1* | 12/2005 | Amano | B60G 3/20 |
| | | | | 280/124.135 |
| 2007/0018419 | A1* | 1/2007 | Kinouchi | B60G 3/20 |
| | | | | 280/124.144 |
| 2007/0074925 | A1 | 4/2007 | Seki et al. | |
| 2007/0176387 | A1* | 8/2007 | Tsuruta | B60G 11/15 |
| | | | | 280/124.135 |
| 2009/0218783 | A1 | 9/2009 | Brandl et al. | |
| 2010/0264616 | A1 | 10/2010 | Gell et al. | |
| 2011/0309600 | A1 | 12/2011 | Allsop et al. | |
| 2012/0043736 | A1 | 2/2012 | Okamoto et al. | |
| 2012/0217078 | A1* | 8/2012 | Kinsman | B60K 17/34 |
| | | | | 280/756 |
| 2018/0281540 | A1* | 10/2018 | Gordon | B62D 23/005 |
| 2018/0281853 | A1 | 10/2018 | Gordon | |
| 2019/0001782 | A1 | 1/2019 | Anderson et al. | |
| 2019/0009632 | A1* | 1/2019 | Holt | B60G 17/0272 |
| 2019/0134520 | A1 | 5/2019 | Egli et al. | |
| 2019/0225041 | A1 | 7/2019 | Upah et al. | |
| 2019/0256136 | A1 | 8/2019 | Gordon | |
| 2019/0299737 | A1 | 10/2019 | Sellars et al. | |
| 2019/0381847 | A1 | 12/2019 | Kumagai et al. | |
| 2020/0148019 | A1 | 5/2020 | McConville et al. | |
| 2020/0148264 | A1* | 5/2020 | Daikoku | F16C 11/06 |
| 2020/0189341 | A1* | 6/2020 | Shin | B60G 7/001 |
| 2020/0282789 | A1* | 9/2020 | Hallundbæk | B60G 13/005 |
| 2021/0370737 | A1* | 12/2021 | Zock | B60G 13/005 |
| 2022/0250691 | A1* | 8/2022 | Berardi | B62D 25/2072 |
| 2023/0136419 | A1* | 5/2023 | Tanaka | B62K 25/24 |
| | | | | 180/233 |

FOREIGN PATENT DOCUMENTS

| | | | |
|---|---|---|---|
| CN | 109664702 | A | 4/2019 |
| CN | 109677221 | A | 4/2019 |
| CN | 208962797 | U | 6/2019 |
| CN | 110861455 | A | 3/2020 |
| DE | 1938850 | A1 | 5/1970 |
| DE | 7027784 | U | 1/1972 |
| DE | 19544276 | A1 | 11/2005 |
| DE | 19751754 | A1 | 1/2011 |
| DE | 10016887 | | 6/2011 |
| DE | 102010030292 | A1 | 12/2011 |
| DE | 102015014027 | A1 | 5/2017 |
| DE | 102016212662 | A1 | 1/2018 |
| DE | 102014003220 | A1 | 2/2019 |
| DE | 102017219778 | A1 | 5/2019 |
| EP | 1741575 | B1 | 1/2007 |
| EP | 1741576 | B1 | 1/2007 |
| EP | 1958797 | A1 | 8/2008 |
| EP | 3356176 | B1 | 4/2020 |
| GB | 1285047 | A | 8/1972 |
| GB | 1285048 | A | 8/1972 |
| GB | 1571030 | A | 6/1979 |
| GB | 2246329 | A | 4/1992 |
| GB | 2270508 | B | 1/1996 |
| JP | H0574911 | U | 10/1993 |
| JP | 2823854 | B2 | 11/1998 |
| KR | 1020080054809 | A | 6/2008 |
| WO | 2014039981 | A1 | 3/2014 |
| WO | 2017120509 | A1 | 7/2017 |
| WO | 2017191023 | A1 | 11/2017 |
| WO | 2019078120 | A1 | 4/2019 |
| WO | 2019204717 | A1 | 10/2019 |

OTHER PUBLICATIONS

Korean Intellectual Property Office, International Search Report and Written Opinion, PCT/US2022/033767, Oct. 7, 2022.

* cited by examiner

Vertical
Longitudinal
(Y) Plane

Vertical
Transverse
(X) Plane

Z

X

Ground

Y

Y

X

Zero Grid
Z-Plane

Z

Horizontal
(Z) Plane

SUSPENSION SYSTEM

This application claims priority to U.S. provisional patent application having Ser. No. 63/322,153 filed on Mar. 21, 2022. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is suspension systems for vehicles, and specifically off-road capable vehicles with a large range of suspension travel.

BACKGROUND

The following description includes information that may be useful in understanding the present invention. It is not an admission that any of the information provided herein is prior art or relevant to the presently claimed invention, or that any publication specifically or implicitly referenced is prior art.

Typical suspension designs for vehicles are designed around creating an offset axis point on the center of the tire mass and lining up to one axis point at the bottom of the tire contact patch. This causes the suspension arm under vehicle load to be static, not dynamic.

To the inventor's knowledge, there are currently no suspension systems that allow a shock assembly to be mounted to a single link of the system but mounted to the link off a center axis of that link.

Suspension systems exist that mount the shock assembly to a single link. However, such systems mount the shock assembly on a point along the center axis of that link. This is to ensure forces are applied to a center of the link such that the link does not twist. However, such suspension systems typically require very little travel or movement within the suspension system and are unsuitable for vehicles requiring a large range of suspension travel.

Examples of multi-link suspension systems where the spring damper assembly connects to a point along the center axis of one link of the system are described in U.S. Pat. No. 4,863,188 published Sep. 5, 1989 and U.S. Pat. No. 7,048,286 published May 23, 2006.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for a multi-link suspension system for a vehicle where the shock assembly mounts to on or off a center axis of a single link while allowing for a large range of suspension travel and individual pivoting or movement of each of the links of the system.

SUMMARY OF THE INVENTION

The inventive subject matter provides apparatus, systems, and methods for suspension systems for vehicles. Such vehicles could include, for example, automobiles, trucks, all-terrain vehicles, snowmobiles, and any other vehicle that requires an accurate level of control and function. The novel suspension systems disclosed herein allows the suspension reaction to vertical loads to be decoupled to suspension movement in reaction to horizontal forces, which can be large. This is especially important in off-road applications. In addition, the contemplated suspension systems can decouple the vertical and horizontal loads and mitigate that input the chassis also mitigate those forces acting on the steering, resulting in the reduction or elimination of such forces. This advantageously can greatly reduce driver/operator fatigue and enhance driver and rider comfort.

The inventive subject matter described herein provides a novel solution to the inherent problems with suspension designs of the prior art. It drastically reduces feedback to the driver/operator in rough terrain without the aid of a stabilizer or dampener. This is accomplished without creating a reduction in the steering feel, but rather only a reduction in the steering forces, by reducing the overall force transmitted from the wheels through the suspension and to the steering wheel.

The inventive subject matter also provides a novel way to mount a shock assembly to a single link of the multi-link suspension system while allowing for a large range of suspension travel. The novel suspension systems described herein permit the shock assembly to be mounted or otherwise coupled off a center axis of the link while ensuring the link does not twist when forces are applied to that side of the link where the shock assembly is mounted. Of course, the shock assembly may be mounted or otherwise coupled on the center axis of the link if desired.

Advantageously, the suspension systems described herein comprise a trunnion coupling the link to which the shock assembly is mounted or otherwise coupled to an adjacent link. The trunnion acts to distribute forces applied to the link to which the shock assembly is mounted or otherwise coupled and prevent twisting of the link due to the applied forces.

Contemplated multi-link suspension systems comprise four independent links that coupled a chassis of a vehicle to a knuckle and articulate to provide for vertical suspension travel and steering suspension articulation. The multi-link suspension systems described herein allow the vehicle to decouple vertical loads from terrain (which are absorbed by vertical suspension travel) and frontal loads from crashing into obstacles, which are absorbed by the rigid yet articulating multi-link suspension system configured around its wheel center pivot points. This novel and optimized method of producing a vehicle suspension, specifically an off-road, high travel suspension, advantageously reduces steering forces while not reducing overall steering feel.

The knuckle preferably comprises an assembly having at least a wheel and a bearing assembly for contacting the ground at a corner of the vehicle. Each of the links attaches to the knuckle at a distinct point, meaning that each of the links attaches to the knuckle in distinct and separate locations from the others. It is also preferred that each of the links attaches to the vehicle's chassis at a distinct point.

It is contemplated that each of the links may couple to the knuckle via a spherical ball joint, such that each of the links can move or pivot independently of the other links. In preferred embodiments, at least some of the links are secured to the spherical ball joint via first and second fasteners disposed on opposite sides of the spherical ball joint. While bolts are preferred, any commercially suitable fasteners could be used that are configured to withstand the forces and stresses encountered when the vehicle is driven.

By utilizing two fasteners to secure the links to the spherical ball joint, this advantageously creates a double shear joint, which distributes the shear forces encountered by the joint leading to less likelihood that the joint and fasteners will fail.

It is further contemplated that a fifth link could include either a tie-rod or toe link and connect the steering column/system to the knuckle to thereby allow for steering of the vehicle. The fifth link is also preferably mounted to the knuckle at a distinct location and independently of the other four links.

It is especially preferred that the suspension system further comprises a spring and damper link or trunnion which is connected to two of the four links described above, preferably either the lower two links (front and back) or the upper two links (front and back). In this manner, the trunnion can be disposed between two suspension links. The shock assembly can be mounted or otherwise coupled to one of the two links to which the trunnion is coupled, and preferably is mounted or otherwise coupled to the link off a center axis of that link. Rather than directly mounting the shock assembly to the link, it is contemplated that a push rod or pull rod suspension design could be used, and that rod could instead be connected to the link.

Preferably, the trunnion is an extensible link, and more preferably, is a rotatably extensible link. It is especially preferred that the trunnion couples to a first link of the four links described above such that the spring and damper link can rotate about an axis with respect to the first link. Preferably, the axis of rotation sis perpendicular to a center axis that runs along a length of the first link. In such embodiments, the trunnion preferably couples to a second link of the four links described above such that the trunnion can pivot and/or rotate about multiple axes with respect to the second link. Thus, the trunnion will have a single axis of rotation at the first link and will have multi-axis rotation at the second link. It is especially preferred that the spring and damper system is coupled to the first link and disposed off a center axis of the first link (e.g., to a left or right side rather than a center of the link).

The trunnion advantageously keeps the first link from twisting due to rotational forces applied to the first link from the shock assembly. In addition, the trunnion allows for the links coupled or connected to the trunnion to continue to independently move or pivot without creating a mechanical bind. This is permitted because the trunnion can move relative to each of the links to which it is coupled.

The shock assembly is therefore able to move with the first link in order to not interrupt the movement of the components within the multi-link suspension system.

Various objects, features, aspects, and advantages of the inventive subject matter will become more apparent from the following detailed description of preferred embodiments, along with the accompanying drawing figures in which like numerals represent like components.

DETAILED DESCRIPTION

Figure 1:
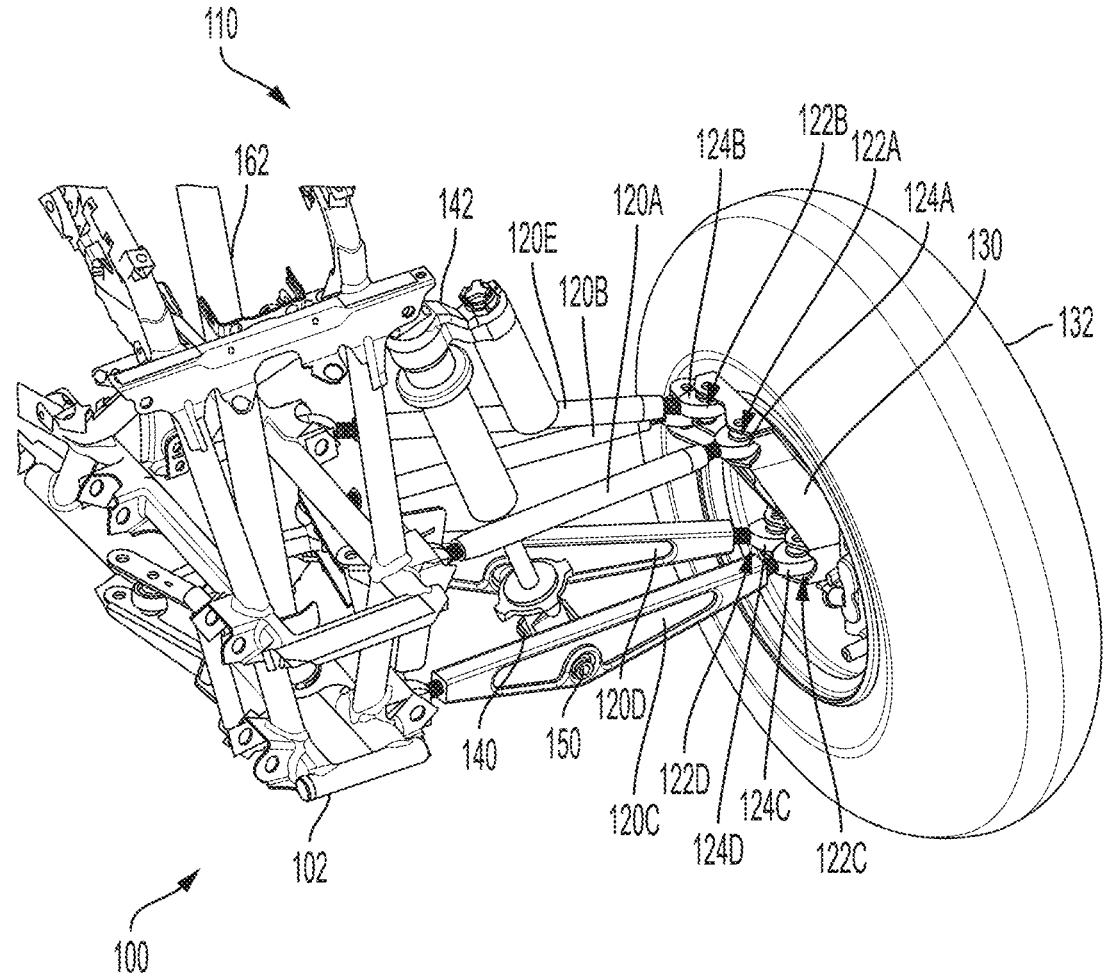
FIGS. 1-4 illustrate one embodiment of a suspension system for a vehicle.
Figure 2:
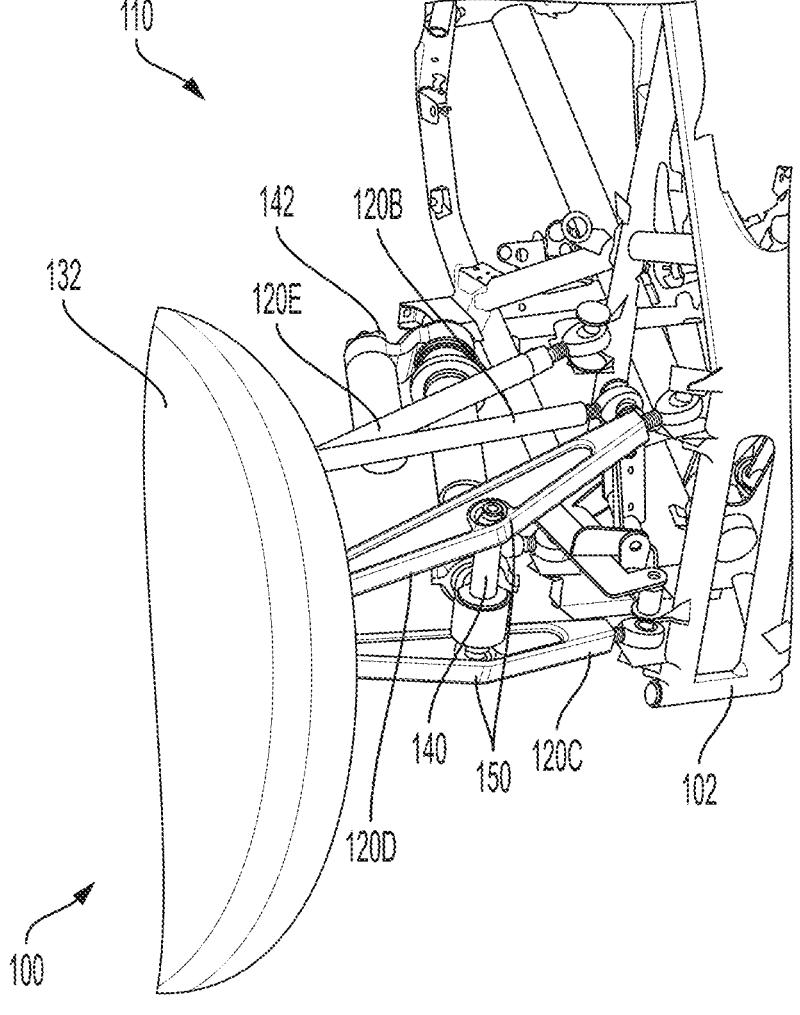
Figure 3:
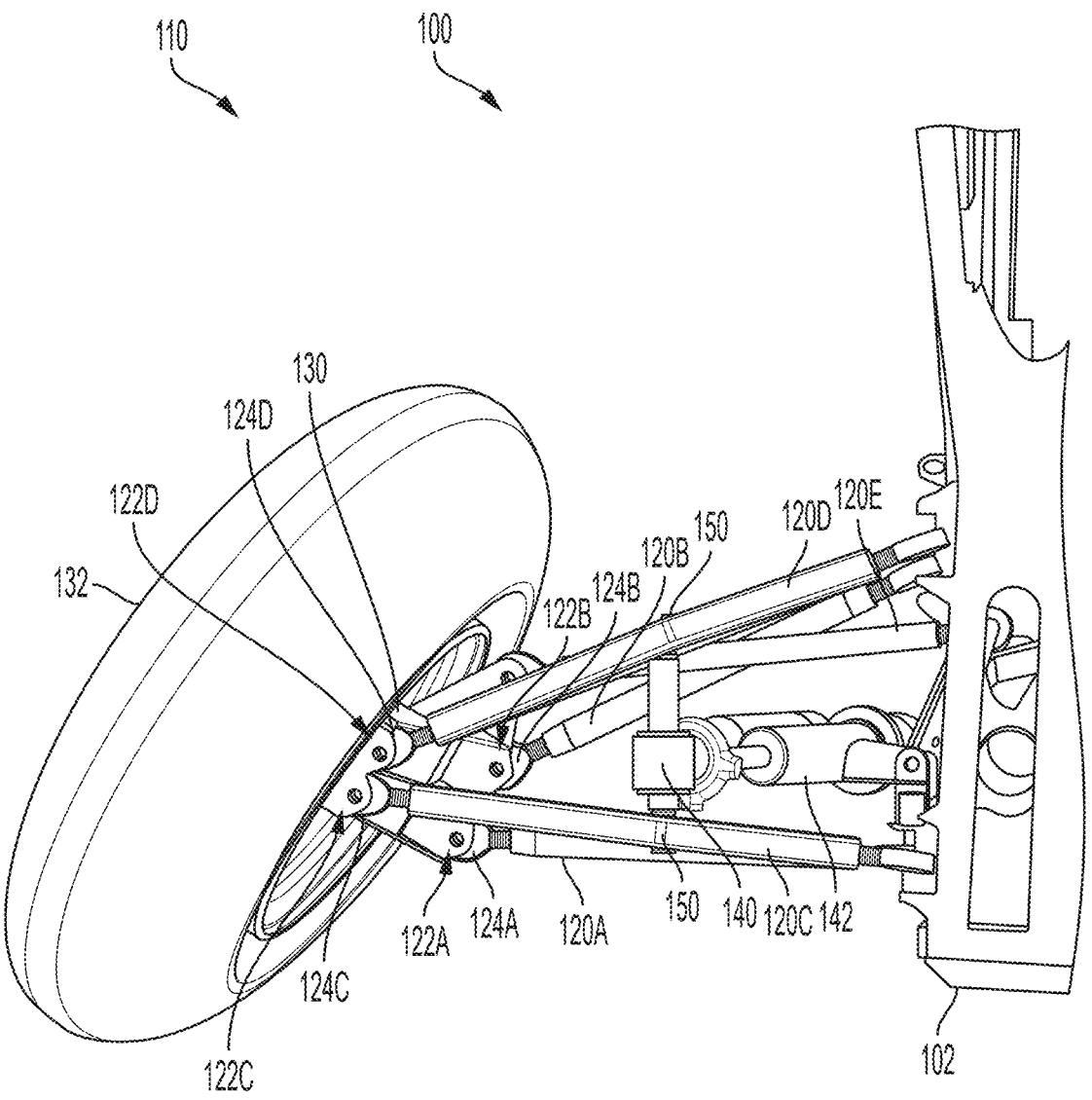
Figure 4:
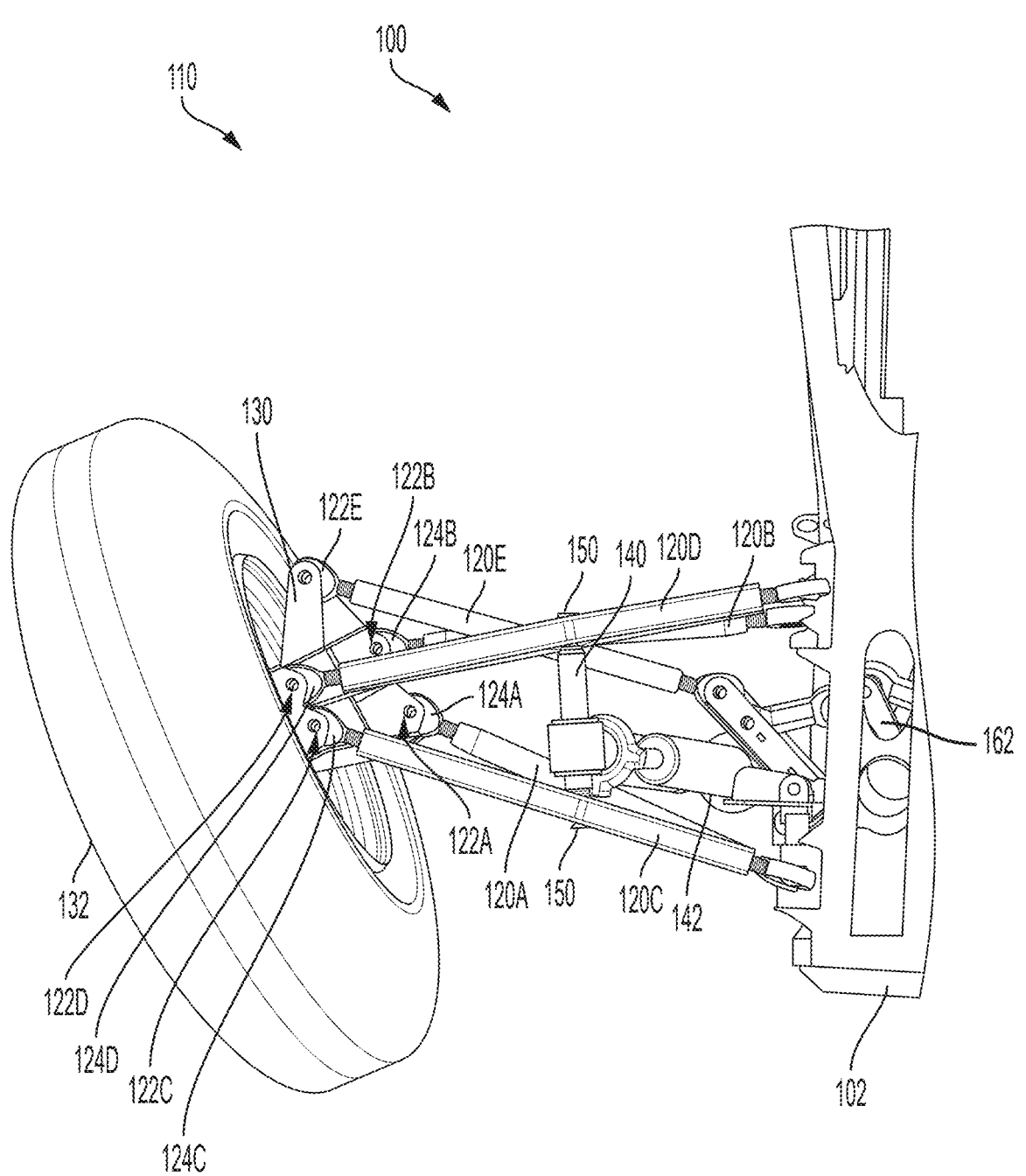
Figure 5:
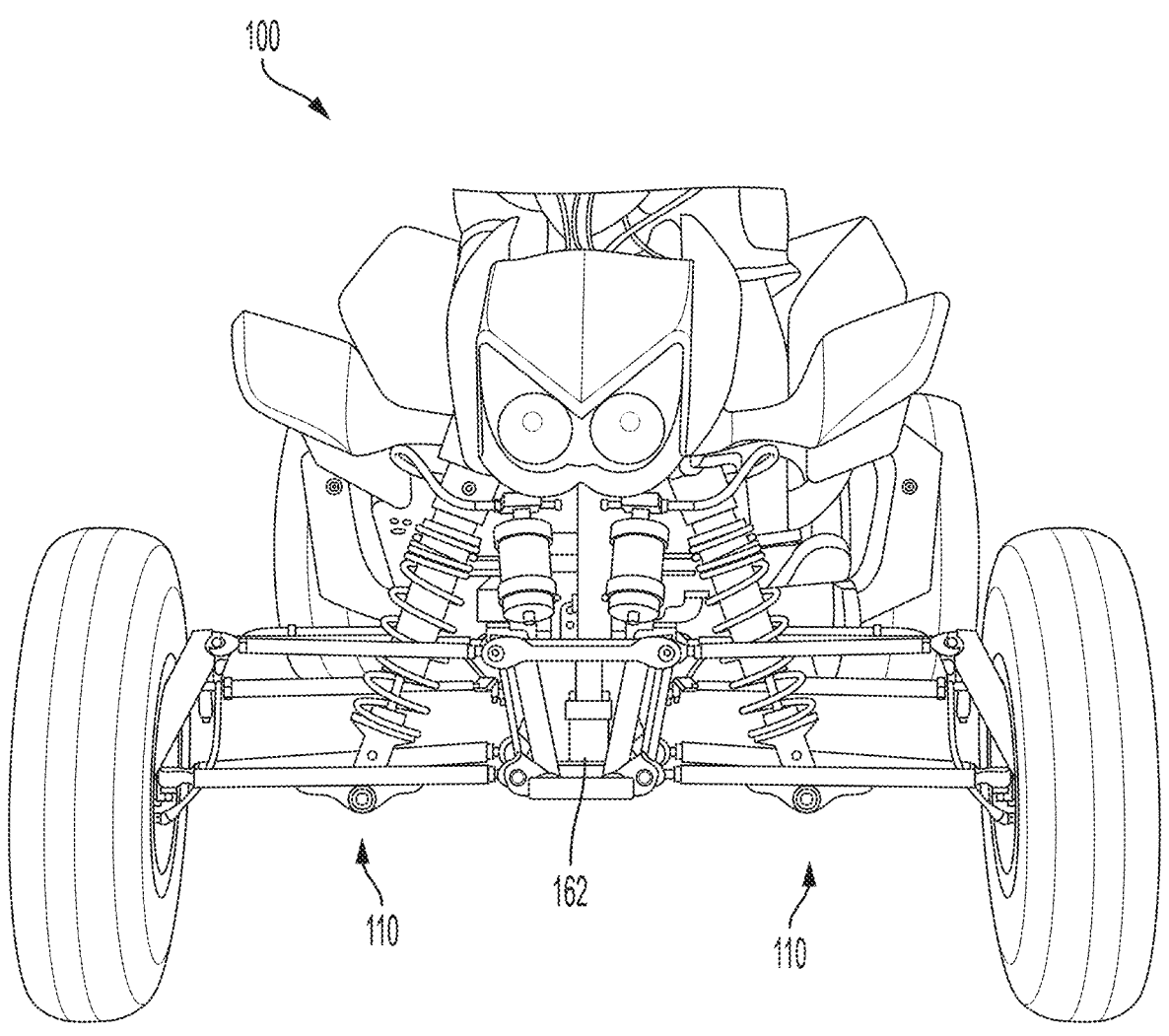
FIG. 5 illustrates one embodiment of an off-road vehicle having the suspension system on either side of the front of the vehicle.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

FIGS. 1-4 illustrates one embodiment of a suspension system 110 for a vehicle 100 described in U.S. patent application Ser. No. 17/499,778 filed on Oct. 12, 2021. Although vehicle 100 depicts an all-terrain vehicle, it is contemplated that the term "vehicle" as used within this application could comprise an automobile, truck, all-terrain vehicle (ATV), utility terrain vehicle (UTV)/side-by-side, snowmobile, model, or remote-controlled vehicle such as a radio-controlled car, an autonomous vehicle, or any other motorized vehicle that requires an accurate level of control and function.

The suspension system 110 comprises a first link 120A that couples to a first point 122A on an upper portion of a knuckle 130 at a first end and a chassis 102 of the vehicle 100 at a second end. As shown, the knuckle 130 connects to a wheel and tire 132. The suspension system 110 also comprises a second link 120B that couples to a second point 122B on the upper portion of the knuckle 130 at a first end independent of the first link 120A, and that couples to the chassis 102 of the vehicle 100 at a second end independent of the first link 120A. As shown, the first point 122A and the second point 122B are distinct from one another.

The suspension system 110 further comprises a third link 120C and a fourth link 120D. The third link 120C couples to a third point 122C on a lower portion of the knuckle 130 at a first end and the chassis 102 of the vehicle 100 at a second end. The fourth link 120D couples to a fourth point 122D on the lower portion of the knuckle 130 at a first end and the chassis 102 of the vehicle 100 at a second end. As shown, the first point 122A, the second point 122B, the third point 122C and the fourth point 122D are preferably distinct from one another, unlike the V-type suspension systems of the prior art where two or more links connect to the knuckle at a single point.

Preferably, each of the links 120A-120D couple to the knuckle 130 via a spherical ball joint. The first end of the first link 120A couples to the first point 122A on the upper portion of the knuckle 130 via a first spherical ball joint 124A. The first end of the second link 120B couples to the second point 122B on the upper portion of the knuckle 130 via a second spherical ball joint 124B. The first end of the third link 120C couples to the third point 122C on the lower portion of the knuckle 130 via a third spherical ball joint 124C, and the first end of the fourth link 120D couples to the fourth point 122D on the lower portion of a knuckle 130 via a fourth spherical ball joint 124D.

Each of the links 120A-120D is preferably secured to its respective spherical ball joint 124A-124D via one or more bolts or other commercially suitable fasteners.

As can be seen from FIGS. 1-4, the first link 120A and the third link 120C connects a front portion of the knuckle 130 to the chassis 102 of the vehicle 100, as shown for one embodiment with spherical bearings 126A and 126C. The second link 120B and the fourth link 120D connects a rear portion of the knuckle 130 to the chassis 102 of the vehicle 100, as shown for one embodiment with spherical bearings 126B and 126D. Each of the first, second, third and fourth links 120A-120D are preferably coupled to the knuckle 130 independent of one another and move and pivot independently of one another. In addition, each of the first, second, third and fourth links comprises a load-bearing arm to allow forces encountered by the wheel and knuckle to be distributed among the links.

As shown in FIG. 1, a spring and damper link 140 is preferably connected to and disposed between two of the links, here the third link 120C and the fourth link 120D. Although shown disposed between the third link 120C and the fourth link 120D, it is contemplated that the spring and damper link 140 could alternatively be disposed between the first link 120A and the second link 120B.

Each of the third link 120C and the fourth link 120D preferably comprises a gusset 150 having an aperture 152 configured to receive a bolt or other commercially suitable fastener. While FIGS. 1-7 show the gusset 150 mounted to a lower portion of each of the third link 120C and the fourth link 120D, it is contemplated that the gusset could alternatively be mounted to (i) an upper portion of both of the third link 120C and the fourth link 120D, (ii) a lower portion of the third link 120C and an upper portion of the fourth link 120D, or (iii) an upper portion of the third link 120C and a lower portion of the fourth link 120D. It is important to note for this embodiment that exhibits the rotatably extensible functionality, that each of the links 120C, 150 and 120D are collinear. While both the lower front link 120C and lower rear link 120D have point 150 off axis, a different embodiment (not depicted) could have only one of link 120D or link 120C have an off-axis connection 150, which would then exhibit twice as much rotatably extensible movement versus both links having connection point 150 off the centerline axis of the link.

Figures 6, 7:
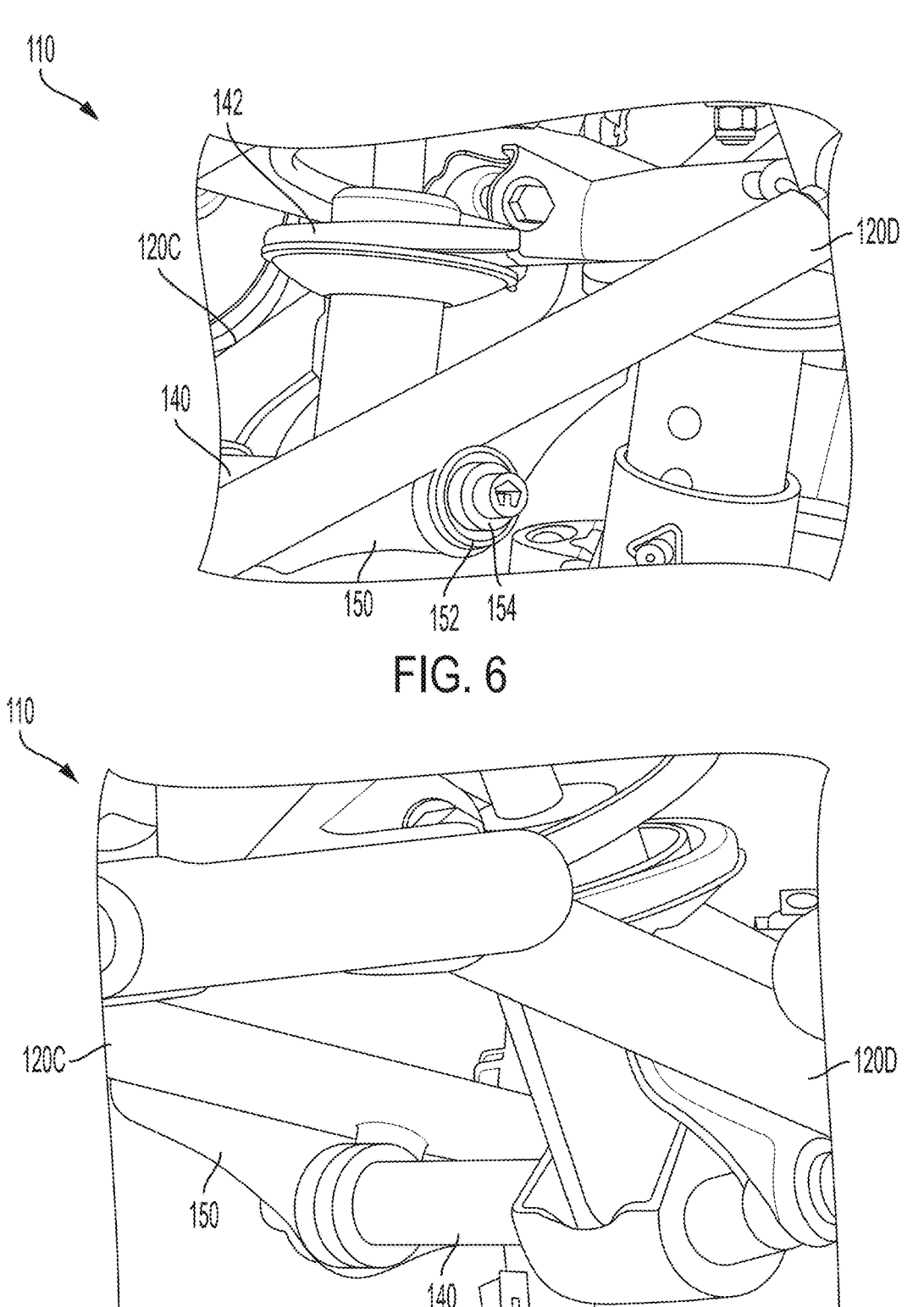
FIGS. 6-7 illustrate an enlarged view of one embodiment of a spring and damper link and shock assembly.

The aperture 152 is surrounded by a set of ball bearings 154 (see FIG. 6). Each end of the spring and damper link 140 abuts one of the apertures 152. The third link 120C and the fourth link 120D are preferably connected with a bolt, which extends through each of the holes of the gusset 150, the spring and damper link 140 and the basket 160 (and through the shock assembly 142 within the basket 160).

A shock assembly 142 is connected at a first end to the spring and damper link 140. As shown in FIG. 7, in some embodiments, the spring and damper link 140 further comprises a basket 160 that receives the shock assembly 142.

Preferably, the spring and damper link 140 is extensible such that the link 140 can accommodate for the motion of the suspension system 110 including both steering motion and the change in position of the links 120C, 120D as the vehicle 100 travels over bumps and undulations of the road or other surface. It is contemplated that the spring and damper link 140 can be telescoping and/or rotatably extensible. As used herein, rotatably extensible is used to mean that the link can rotate at both ends relative to the links 120C, 120D to effectively be extensible and accommodate the change in position of the links 120C, 120D without necessitating a telescoping member. While the spring and damper link 140 is attached to a lower portion near the center of the links 120C, 120D, and the links 120C, 120D can both rotate along their length freely to allow the off-centerline articulation of the spring and damper link 140 mounted with spherical bearings at each end, as needed to perform the rotatably extensible functionality. In a different yet related embodiment, it is contemplated that only one of link 120C or 120D would need to be configured to exhibit rotatable extensible behavior with an off-axis connection point 150, and the other of the two links could have on axis connection to the spring and damper link 140.

In some embodiments, the spring and damper link 140 comprises first and second ends and is configured to increase or decrease its length in response to a movement of one or both of the third link 120C and the fourth link 120D. In this manner, it is contemplated that the spring and damper link 140 could comprise telescoping cylinders or have another configuration permitting it to vary in length in response to movement of one or both of the links. In such embodiments, the spring and damper link 140 preferably lies within a plane defined by the third and fourth links 120C, 120D, and is linearly fixed and rotatable at one of the first and second ends and passes through a rotatable bearing system at the other end to accommodate movement of a fifth link or steering link 120E and/or the movement of the third and fourth links 120C. 120D during travel of the vehicle By mounting the shock assembly 142 on the spring and damper link 140, the spring and damper link 140 can distribute forces absorbed through the shock assembly through the two links 120C, 120D for strength, while not interrupting the balanced state between the forces distributed among the links, which is required in order to eliminate the feedback to the handlebar or steering wheel.

Although shown that the spring and damper link 140 is mounted to or lower surface of each of the third link 120C and the fourth link 120D, it is contemplated that the spring and damper link 140 could alternatively be mounted to an upper surface of each of the third link 120C and the fourth link 120D.

As can be seen in FIGS. 1-4, the spring and damper link 140 is preferably mounted to each of the third link 120C and the fourth link 120D, such that the spring and damper link 140 is non-orthogonal or off-normal relative to each of the third link 120C and the fourth link 120D. In other words, the angle as measured between the spring and damper link 140 and either of the third link 120C and the fourth link 120D is not equal to ninety degrees.

To allow steering of the vehicle 100, the suspension system 110 comprises a fifth link 120E that couples to a fifth point 122E of the knuckle 130 at a first end and the steering system 162 of the vehicle 100 at a second end.

Although only one side of the suspension system 110 is shown in FIGS. 1-4, FIG. 5 illustrates vehicle 100 having a suspension system 110 on the front-left and front-right sides of the vehicle 100. So, in the above example, each of the left and right sides has a suspension system 110 as described above with the four links that individually couple to a knuckle. A shock assembly can also be coupled to two of the links on each side of the vehicle 100, such as in the manner described above.

Figure 8:
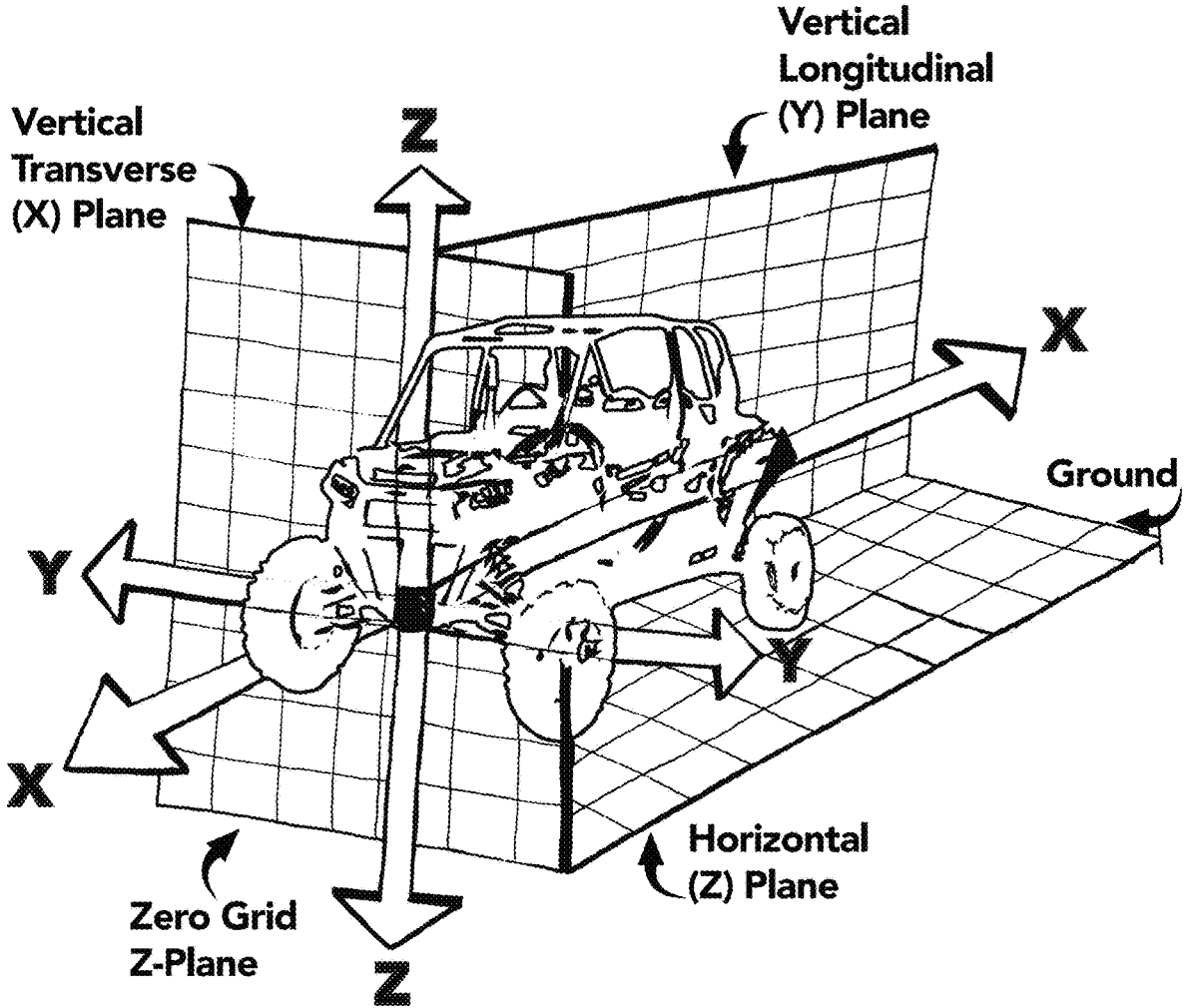
FIG. 8A illustrates vertical transverse, vertical longitudinal, and horizontal planes as used relative to a vehicle.
FIG. 8B illustrates perpendicular axes including yaw, pitch and roll relative to a vehicle.
Figure 8:
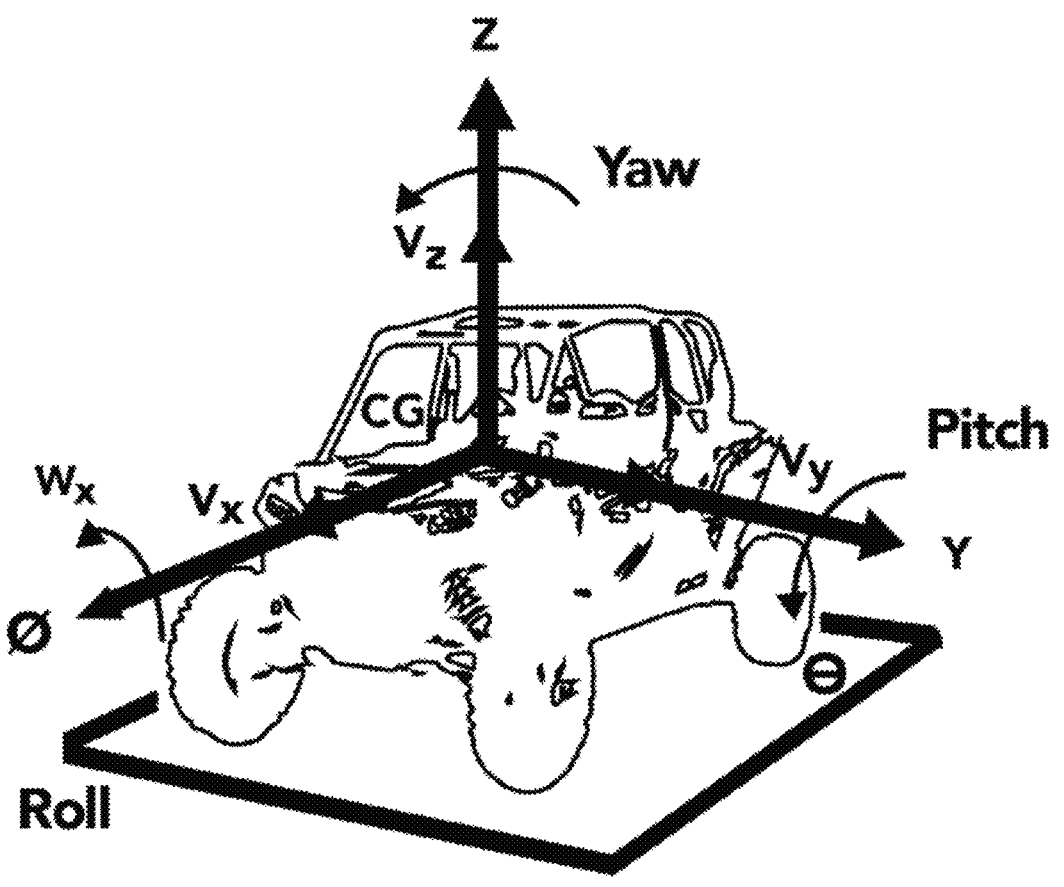

FIG. 8A illustrates perpendicular planes relative to a vehicle, while FIG. 8B illustrates perpendicular axes including yaw, pitch and roll relative to a vehicle.

Figure 9:
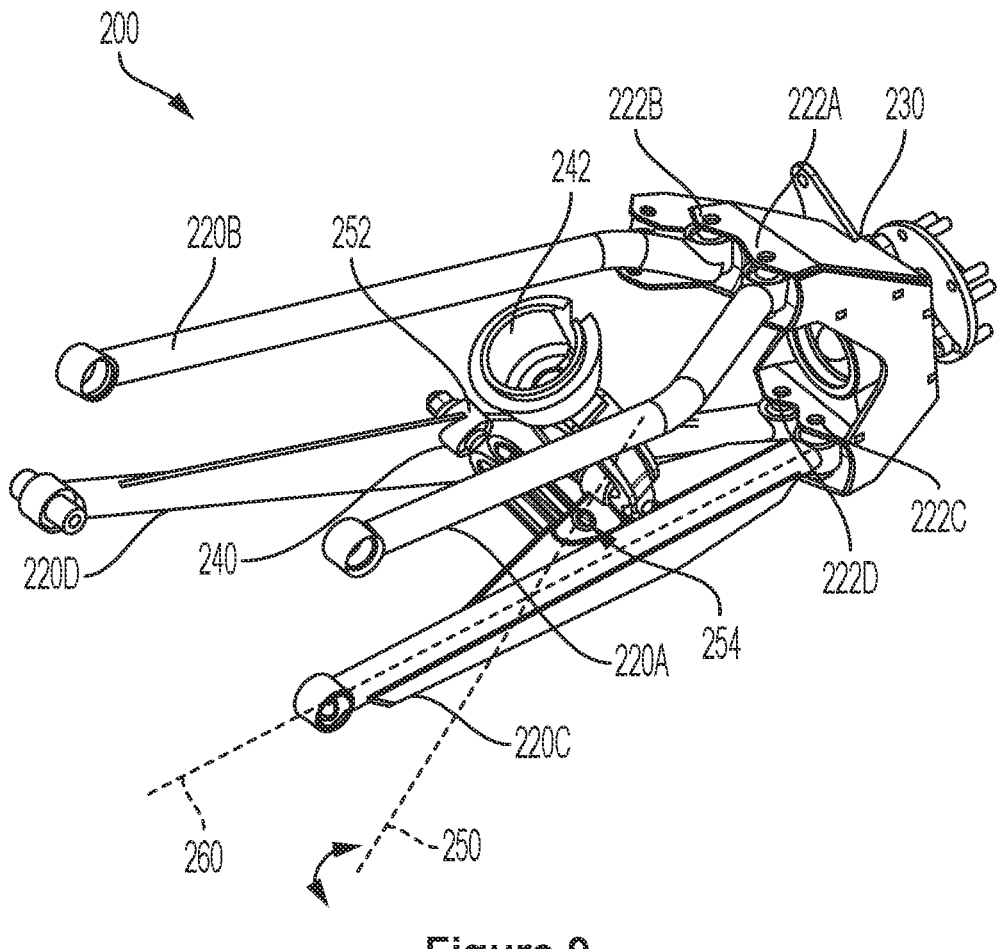
FIGS. 9-10 illustrates another embodiment of a suspension system for a vehicle.
Figure 10:
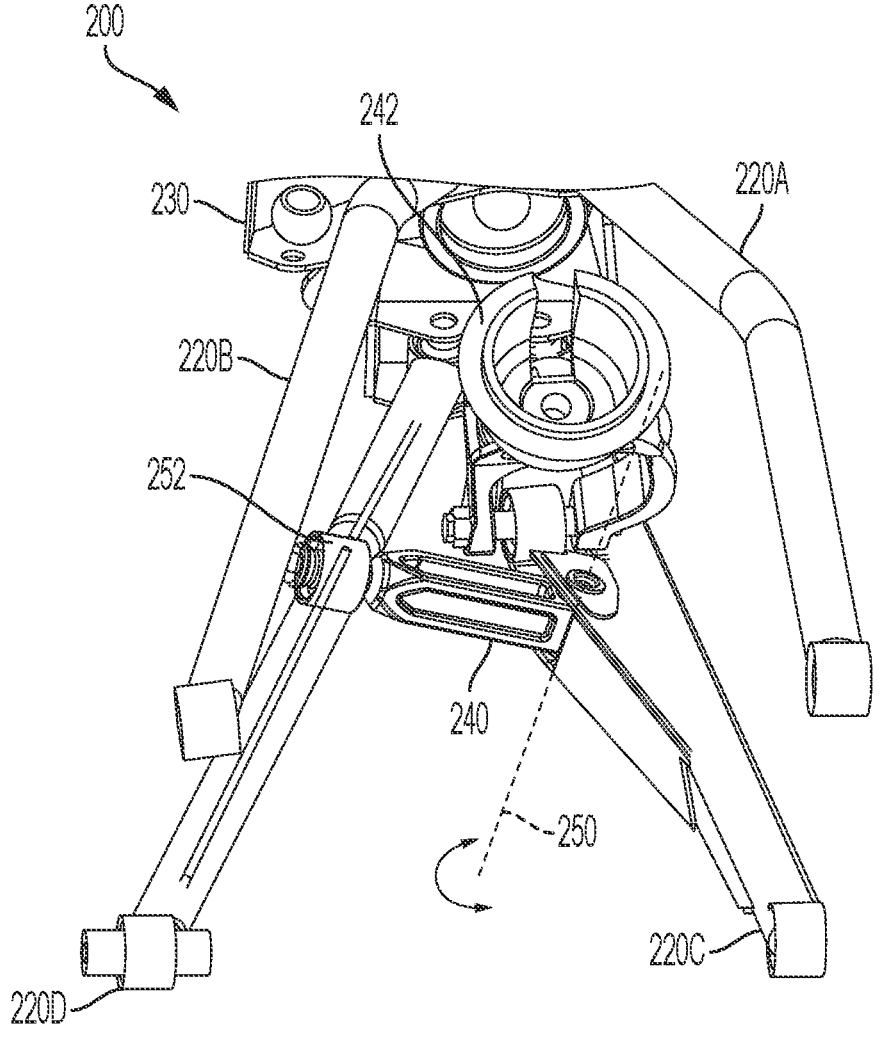

FIGS. 9-10 illustrates another embodiment of a suspension system 200 for a vehicle. Contemplated vehicles include those described above.

The suspension system 200 comprises a first link 220A that couples to a first point 222A on an upper portion of a knuckle 230 at a first end and a chassis of the vehicle at a second end. A center axis 260 runs along a length of the first link 220A from the first point 222A to a point where the first link 220A couples to the chassis of the vehicle. The suspension system 200 also comprises a second link 220B that couples to a second point 222B on the upper portion of the knuckle 230 at a first end independent of the first link 220A, and that couples to the chassis of the vehicle at a second end independent of the first link 220A. As shown, the first point 222A and the second point 222B are distinct from one another.

The suspension system 200 further comprises a third link 220C and a fourth link 220D. The third link 220C couples to a third point 222C on a lower portion of the knuckle 230 at a first end and the chassis of the vehicle at a second end. The fourth link 220D couples to a fourth point 222D on the lower portion of the knuckle 230 at a first end and the chassis of the vehicle at a second end. As shown, the first point 222A, the second point 222B, the third point 222C and the fourth point 222D are distinct from one another, unlike the V-type suspension systems of the prior art where two or more links connect to the knuckle at a single point. In other embodiments, it is contemplated that two of the links could form an A-arm or other suspension component where they are connected to each other and move together rather than independently.

Preferably, each of the links 220A-220D couples to the knuckle via a spherical ball joint. Each of the links 220A-220D is preferably secured to its respective spherical ball joint via one or more bolts or other commercially suitable fasteners. It is especially preferred that at least two of the links are secured to their respective spherical ball joint via two fasteners, where each fastener is disposed on an opposite side of the spherical ball joint.

As can be seen from FIGS. 9-10, the first link 220A and the third link 220C couple a front portion of the knuckle 230 to the chassis of the vehicle. The second link 220B and the fourth link 220D couple a rear portion of the knuckle 230 to the chassis of the vehicle. Each of the first, second, third and fourth links 220A-220D are preferably connected to the knuckle 230 independent of one another and move and pivot independently of one another. In addition, each of the first, second, third and fourth links comprises a load-bearing arm to allow forces encountered by the wheel and knuckle to be spread among the links.

A spring and damper link or trunnion 240 is preferably connected to and disposed between two of the links, here the third link 220C and the fourth link 220D (i.e., the two lower links). Although shown disposed between the third link 220C and the fourth link 220D, it is contemplated that the spring and damper link 240 could alternatively be disposed between the first link 220A and the second link 220B.

As shown in FIGS. 9-10, the spring and damper link 240 is preferably rotatably coupled to the third link 220C at point 252, such that the spring and damper link 240 can rotate about an axis 250 in the directions shown in FIG. 9. As shown, axis 250 is preferably perpendicular to axis 260.

In contrast, the spring and damper link 240 is preferably pivotally coupled to the fourth link 220D, such that the spring and damper link 240 can rotate or pivot about multiple axes (e.g., X, Y and Z axes shown in FIG. 8A). It is contemplated that the spring and damper link 240 can be coupled to the fourth link 220D by a spherical ball joint 252. Thus, in such embodiment, the spring and damper link 240 will be constrained in movement about a single axis at the third link 220C and is less constrained at the fourth link 220D. In other words, the spring and damper link 240 will have a single axis of rotation at the third link 220C and will have multi-axis rotation at the fourth link 220D.

It is especially preferred that the shock assembly 242 or spring and damper system is mounted or otherwise coupled at a first end to the third link 220C and is preferably disposed off the center axis 260 of the third link 220C such that forces from the shock assembly 242 are applied off-center to the third link 220C. The spring and damper link 240 advantageously keeps the third link 220C on an inline from rotational forces caused by the shock assembly 242 to prevent twisting of the third link 220C for example.

Preferably, the spring and damper link 240 is configured to move in response to a movement of one or both of the third link 220C and the fourth link 220D. As discussed above, by mounting the shock assembly 242 on the spring and damper link 240, the spring and damper link 240 can distribute forces absorbed through the shock assembly 242 by the third link 220C to the fourth link 220D for strength and to prevent twisting of the third link 220C, while not interrupting the balanced state between negative and positive pressure among the links, which is required in order to eliminate the feedback to the handlebar or steering wheel.

To allow steering of the vehicle, the suspension system 200 comprises a fifth link that couples to a fifth point of the knuckle 230 at a first end and the steering system of the vehicle at a second end. With respect to the remaining numerals in each of FIGS. 9-10, the same considerations for like components with like numerals of FIGS. 1-4 apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A suspension system for at least one corner of a vehicle having a chassis or multiple subframes, comprising:

a knuckle assembly carrying at least a wheel and bearing assembly for contacting the ground at an edge of the vehicle;

a first link that connects to the knuckle assembly via a first rotatable joint and connects to a chassis or subframe on the vehicle, wherein the first rotatable joint is rotatable in at least one plane;

a second link that connects to the knuckle assembly via a second rotatable joint that is different from the first rotatable joint and connects to the chassis or subframe on the vehicle, wherein the second rotatable joint is rotatable in at least one plane;

a spring and damper link that connects the first link to the second link, wherein the spring and damper link has a first end coupled to the first link and a second end coupled to the second link, wherein the spring and damper link is rotatably coupled to each of the first and second links such that the spring and damper link can rotate with respect to each of the first link and the second link; and a spring damper system comprising a shock assembly, wherein the shock assembly is mounted or coupled to the first link off a center axis of the first link.

2. The suspension system of claim 1, further comprising:

a third link that connects to the knuckle assembly via a third rotatable joint and connects to the chassis or subframe on the vehicle, wherein the third rotatable joint is rotatable in at least one plane and does not lie in a plane defined by any points of the first or second link; and a fourth link that connects to the knuckle assembly via a fourth rotatable joint and connects to the chassis or subframe on the vehicle, wherein the fourth rotatable joint is rotatable in at least one plane.

3. The suspension system of claim 2, further comprising:

a fifth link that connects to the knuckle assembly via a fifth rotatable joint and connects to the chassis or subframe on the vehicle, wherein the fifth rotatable joint is rotatable in at least one plane and used to steer the wheel or prevent steering of the wheel.

4. The suspension system of claim 1, wherein the first link comprises a front, lower link, and wherein the second link comprises a rear, lower link.

5. The suspension system of claim 1, wherein the spring and damper link is constrained to rotate about a first axis at the first link.

6. The suspension system of claim 5, wherein the first axis is perpendicular to the center axis of the first link.

7. The suspension system of claim 5, wherein the spring and damper link is pivotally coupled to the second link such that the spring and damper link is rotatable about multiple axes with respect to the second link.

8. The suspension system of claim 1, wherein the spring and damper link is rotatably extensible during movement of the first or second links.

9. The suspension system of claim 1, wherein the spring and damper link is rotatably coupled to the first link at the first end and pivotally coupled to the second link at the second end, such that during vertical travel of the knuckle, the first and second links will each move to permit movement of the spring and damper link.

10. The suspension system of claim 1, wherein the first link is movable and pivotable independently of the second link with respect to the knuckle assembly.

11. The suspension system of claim 10, wherein each of the first and second rotatable joints comprises a spherical ball joint that permits multi-axis rotation.

12. The suspension system of claim 1, wherein the shock assembly is mounted to the first link and not the second link.

13. A suspension system, comprising:

a knuckle assembly carrying at least a wheel and bearing assembly for contacting the ground at an edge of the vehicle;

a first link coupled to the knuckle assembly via a first rotatable joint and coupled to a chassis or subframe on the vehicle, wherein the first rotatable joint is rotatable in at least one plane;

a second link coupled to the knuckle assembly via a second rotatable joint and coupled to the chassis or subframe on the vehicle, wherein the second rotatable joint is rotatable in at least one plane;

wherein the first and second link can move independently of one another;

a spring and damper link that connects the first link to the second link, wherein the spring and damper link is rotatably coupled to each of the first and second links such that the spring and damper link can rotate with respect to each of the first link and the second link; and a spring damper system comprising a shock assembly, wherein the shock assembly is mounted or coupled to the first link off a center axis of the first link.

\* \* \* \* \*